United States Patent [19]
White

[11] Patent Number: 5,147,133
[45] Date of Patent: Sep. 15, 1992

[54] TANK TRUCK WITH AGITATOR FOR FLUID PRODUCTS

[76] Inventor: Justin T. White, P.O. Box 392, Velva, N. Dak. 58790

[21] Appl. No.: 656,204

[22] Filed: Feb. 15, 1991

[51] Int. Cl.$^5$ .................. B01F 7/08; B01F 15/00; B01F 15/06
[52] U.S. Cl. .................. 366/138; 366/149; 366/296; 366/318; 366/331; 134/166 R
[58] Field of Search .................. 366/64, 293, 296, 331, 366/603, 318, 149, 20, 38, 279, 285, 2, 3, 7, 12, 24, 46, 50, 56, 58, 59, 66; 134/166 R, 169 R; 384/209, 435, 585, 138; 403/26

[56] References Cited

U.S. PATENT DOCUMENTS

| | | | |
|---|---|---|---|
| 558,262 | 4/1896 | Darling | 384/209 |
| 1,158,844 | 11/1915 | Price | 403/26 |
| 1,896,616 | 2/1933 | Gillican | 366/318 |
| 2,009,734 | 7/1935 | Hiller et al. | 259/9 |
| 2,147,878 | 2/1939 | Burmeister | 403/26 |
| 3,101,730 | 6/1961 | Harris et al. | 134/167 |
| 3,121,027 | 2/1964 | Galanon | 134/10 |
| 3,194,639 | 7/1965 | Brown | 366/293 |
| 3,228,663 | 1/1966 | Travis . | |
| 3,477,452 | 11/1969 | Mohamed | 134/169 R |
| 3,610,588 | 10/1971 | Diefenbach | 366/24 |
| 3,666,241 | 5/1972 | Re | 366/296 |
| 4,044,951 | 8/1977 | Waite | 239/1 |
| 4,194,925 | 3/1980 | Holbrook | 366/64 |

FOREIGN PATENT DOCUMENTS

| | | | |
|---|---|---|---|
| 0147631 | 7/1985 | Fed. Rep. of Germany | 366/50 |
| 0012648 | 10/1910 | France | 366/293 |
| 0099327 | 7/1980 | Japan | 366/293 |

Primary Examiner—Philip R. Coe
Assistant Examiner—Randall Edward Chin
Attorney, Agent, or Firm—James V. Harmon

[57] ABSTRACT

A tank truck is provided for transporting a variety of fluids such as water, petroleum products or drilling mud and includes an agitator comprising a pair of horizontally disposed longitudinally aligned agitator elements each including a longitudinally extending helical flight. The agitators are supported at their adjacent ends by means of a releasable and removable bearing and by outboard bearings at the ends of the tank which allow limited articulation of the augers to facilitate their removal with portions of the auger shafts extending outwardly beyond the outboard bearings to reversible drive motors which turn the augers during operation in the same or opposite directions so that different modes of operation can be used for transporting the fluid by both augers in the same or opposite directions. The invention also includes pivotable spray heads mounted in the tank for washing the tank with heat exchangers provided for transferring engine heat to the tank contents and to the washing fluid.

11 Claims, 3 Drawing Sheets

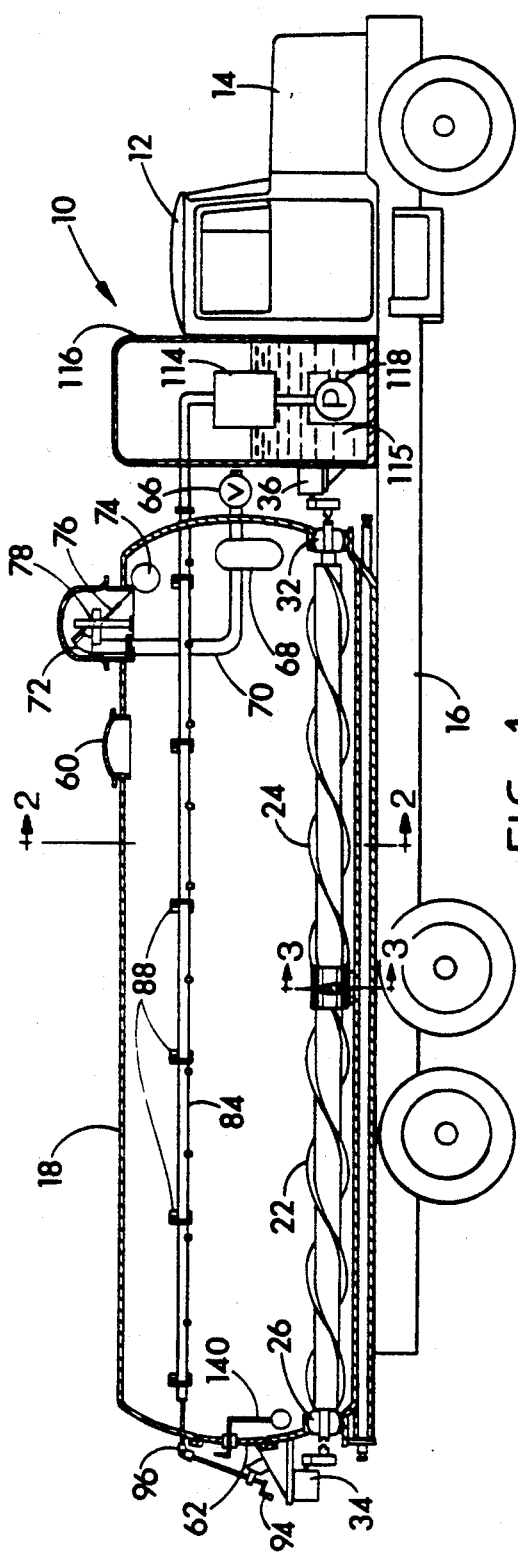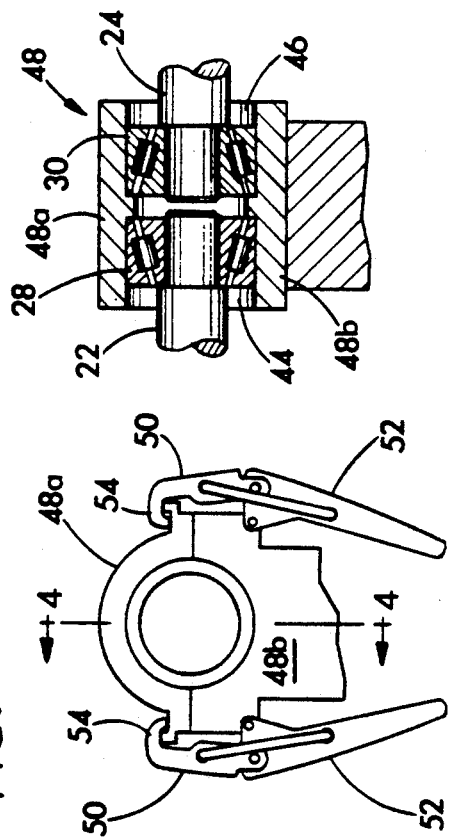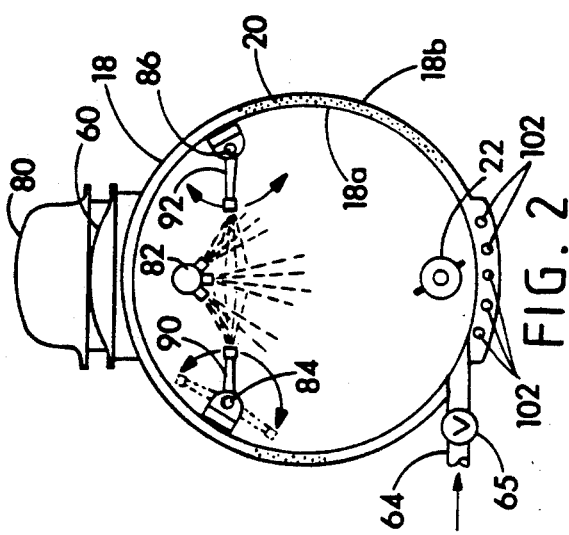

TANK TRUCK WITH AGITATOR FOR FLUID PRODUCTS

FIELD OF THE INVENTION

This invention relates to tanks for transporting fluid products and more particularly to tanks containing an agitator for stirring the fluid product while within the tank.

BACKGROUND OF THE INVENTION

Tank trucks have been widely used for a variety of purposes. The invention is concerned particularly with the transportation of fluids which tend to settle during storage or which may freeze or for other reasons may require agitation. One example is drilling mud used in oil fields for filling well holes. Drilling mud has a tendency to settle during storage and in some locations will freeze in the tank, which is of course unacceptable. In Alaska, for example, I have seen oil well drilling mud freeze in some portions of a tank truck in less than an hour. An important objective of the invention is to provide a practical means for agitating a fluid product such as drilling mud while being transported by tank truck. Another objective is to provide a tank truck which is versatile with respect to the fluids that can be transported so that it is capable of use for any application desired. Thus, one day it may used for drilling mud but the next day for water and on another occasion for transporting crude oil or other petroleum product. Tank trucks previously available have either been limited as to the type of product they can carry or have not been satisfactory for rapid conversion from one type of product to another. Prior tank trucks moreover do not provide a good means for agitating a thick or semi-fluid material such as drilling mud or for distributing heat from a heater to different parts of the tank as desired. The drilling mud therefore may, under certain circumstances, have a tendency to settle or become frozen around the edges. Previously, once the freezing process started it interfered with the agitator operation and this in turn allowed the material to freeze at an even faster rate.

In view of these and other shortcomings of the prior art, it is an object of the invention to provide an improved tank truck capable of rapidly loading and transporting a variety of fluids including water, petroleum, fuel oil, drilling mud and the like.

Another object is to reduce the cleanup time when the tank truck is converted from one product such as drilling mud to another product such as petroleum.

Another object is to provide a tank truck of the type described which is easy to work on and requires few if any tools for routine operation and cleanup by the operator.

Another object is to provide improved agitation capable of moving a fluid product within the tank in any one of several modes to produce currents in different directions and when a heater is present to carry the heat in different directions as desired.

A further object is to enable the agitators to be removed and replaced quickly and efficiently and preferably without the use of special tools.

Yet another object is to provide an improved tank truck of the type described in which the tank is easy to enter and includes a heater.

SUMMARY OF THE INVENTION

The present invention provides a tank truck containing an agitator for fluid products to stir the products while in the tank. The tank in accordance with the present invention can be mounted on the truck bed itself or can be mounted on a truck trailer for attachment to a truck and while for convenience described herein as a tank mounted directly on a truck bed, the term "tank truck" as used herein will refer both to tanks mounted directly on the truck itself or those hauled behind a truck on a trailer.

Preferably the agitation means comprises two movable agitator elements mounted in cooperative relationship from the standpoint of their relative positions and each is preferably reversible so that when operated in the same direction, they will propel fluid in the tank in the same direction but when operated in reverse directions will propel the fluid to form currents passing either toward or away from one another. With both operating in reverse the fluid will take a different path opposite that taken when both are operated in a forward direction. The tank is preferably insulated and includes a heater for maintaining the temperature of the contents in a desired range. The tank also preferably includes a provision for distributing heated cleaning fluid such as hot water over the inside of the tank. Distribution nozzles for the cleaning fluid are preferably provided in at least two locations in the tank so that all portions of the inside of the tank can be easily cleaned.

The invention also includes additional features which will be described in more detail by reference to the figures which illustrate by way of example one preferred form of the invention.

THE FIGURES

FIG. 1 is a side elevational view of a tank truck in accordance with the present invention, partly in section.

FIG. 2 is a transverse sectional view taken on line 2—2 of FIG. 1.

FIG. 3 is an enlarged cross-sectional view taken on line 3—3 of FIG. 1.

FIG. 4 is a longitudinal sectional view taken on line 4—4 of FIG. 3.

DETAILED DESCRIPTION OF THE INVENTION

Figure 5:
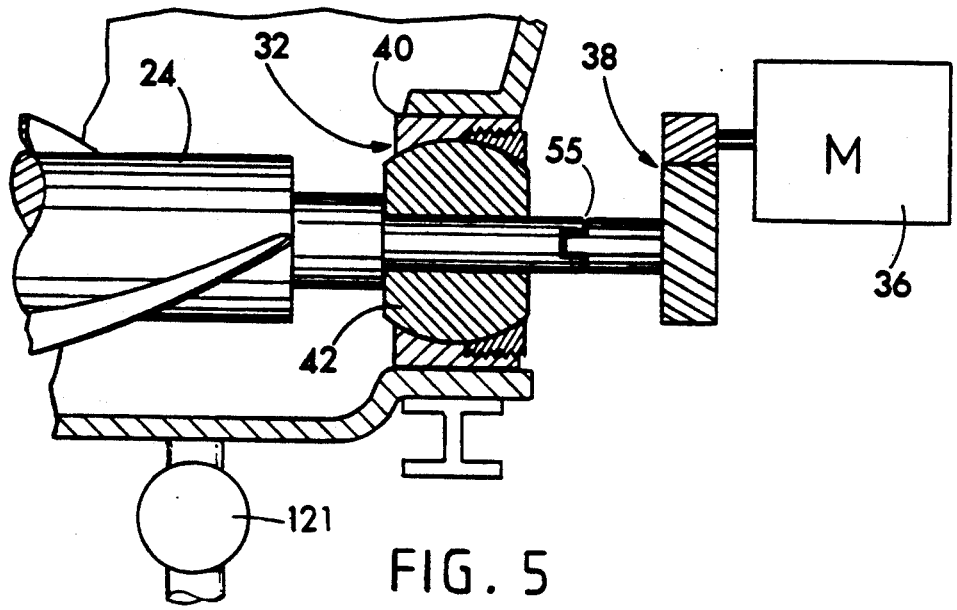
FIG. 5 is an enlarged partial vertical cross-sectional view of the lower portion of the front end of the tank showing the agitator bearing.

Referring now to the figures there is shown a tank truck 10 having a cab 12, motor compartment 14, framework 16 and insulated tank 18 comprising inner and outer spaced apart tank walls 18a and 18b having insulation such as foam insulation 20 between them. The tank 18 can be suitably mounted on the framework 16 or provided on a separate trailer (not shown) as described above.

Within the tank are provided a pair of aligned longitudinally spaced apart agitators 22 and 24 supported by bearings 26 and 28, 30 and 32, respectively, in cooperative relationship relative to one another with respect to their positions to distribute fluid (and in some cases heat absorbed from a heater) in the same or in different directions. The agitators in this case comprise helically flighted augers but can take other forms if desired. The free ends of the shafts of agitators 22 and 24 project through the bearings 26 and 32 out through the tank wall and are driven through suitable reduction gearing by motive power means such as independent reversible hydraulic motors 34 and 36. Thus for example as shown in FIG. 5, motor 36 drives agitator 24 through gear train 38. The drive for the agitator 22 is similar and both are independent and reversible.

The bearings 26 and 32, which are substantially identical, are of the self-aligning type with the provision of an outer casing 40 having a spherical opening within which is mounted a spherical bushing 42 to allow a small amount of up-and-down articulation on a transverse axis about the center of the bearing 32. Bearing 26 is similar.

The adjacent ends of the agitators 22 and 24 are supported in bearings 28 and 30 which are removably mounted in pockets 44 and 46 in a journal support housing indicated generally at 48 and comprising an upper journal housing cap 48a and a lower portion 48b. The cap 48a can be easily and quickly removed by the provision of manually operable toggle clamps 50 on either side. Each toggle clamp 50 includes a handle 52 which when lifted will release a hook 54 thereby allowing the cap 48a to be removed and enabling the adjacent ends of the agitators 22 and 24 to be lifted from the journal housing. As this is done the opposite ends of the agitators pivot in the self-aligning bearings 26, 32. The agitators can then be removed, e.g. for repair, and will separate from the gear drive by the provision of a releasable shaft coupling 55 (FIG. 5).

Access to the tank is provided by means of a top hatch 60 and rear hatch 62, each suitably secured in place conventionally. It is through these hatches that the operator can enter for cleaning, repair or inspection. Fluid such as drilling mud or oil is drawn into the tank during operation through a supply pipe 64 (FIG. 2) via valve 65. To draw the fluid into the tank, a vacuum is provided in the tank by means of a vacuum pump 66 connected via liquid trap 68 and vacuum line 70 to a vacuum shutoff valve 72 actuated by a float 74 at the end of a float lever 76 pivoted at 78 within the dome 80 so that when the level of fluid in the tank rises to the level of the float 74 vacuum in line 70 will be shut off by valve 72.

Cleaning of the tank is accomplished by means of a spray washer consisting of three longitudinally extending supply pipes 82, 84 and 86, the latter two of which are pivotally supported in vertically aligned, longitudinally spaced apart bearings 88. The supply pipes 84 and 86 are provided with longitudinally spaced apart spray nozzles 90 and 92 and can be articulated as shown by arrows in FIG. 2 on their bearings 88 by the provision of a hand operated crank 94 which is coupled to the supply pipes by means of a U-joint connection 96 so that the operator standing behind the truck can swing the sprayer nozzles 90, 92 up and down as required by moving each of the handles 94 to readily and efficiently clean the inside of the tank. Nozzle 90 reaches anything nozzle 92 misses and vice versa. The spray washer pipe 82 is fixed and includes a plurality of spray heads for spraying various portions of the inside of the tank.

Figure 9:
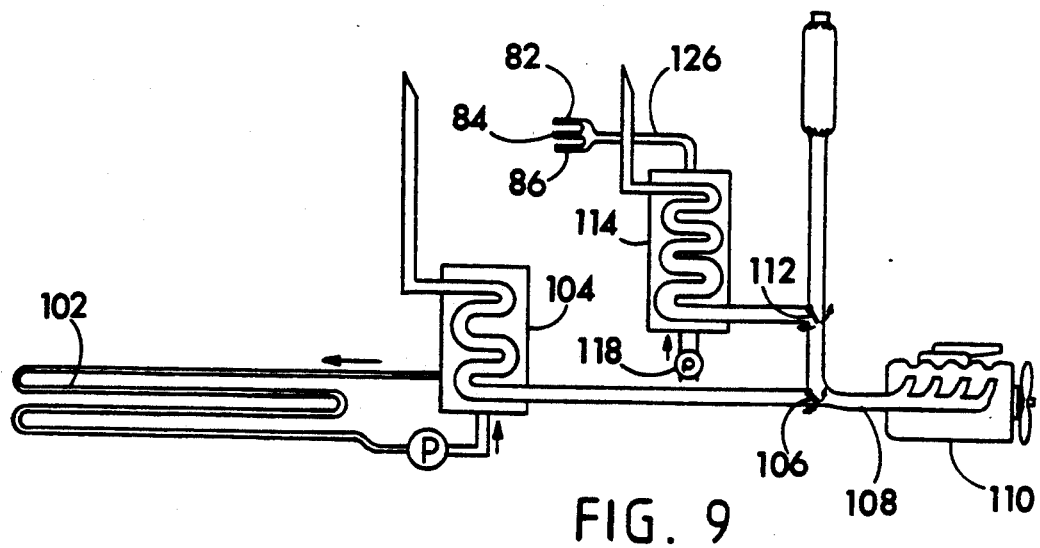
FIG. 9 is a schematic view of the heating system employed in accordance with one form of the invention.

Heat is supplied to the tank 18 by provision of heater pipes 102 (FIGS. 2 and 9). Any suitable fluid such as a mixture of water and ethylene glycol can be circulated between the heater pipes 102 and a heat exchanger 104 (FIG. 9) which is coupled to receive engine heat via valve 106 from the exhaust pipe 108 of the truck engine 110. A valve 112 can also be used to deflect a portion of the exhaust from the exhaust pipe 108 to another heat exchanger 114 through which a cleaning fluid such as water 115 within a storage tank 116 is pumped by means of pump 118 through the heat exchanger 114 out through pipe 126 to the washing fluid supply pipes 82, 84 and 86 already described. Pump 118 is isolated from the liquid 115 by a surrounding chamber.

To operate the tank truck, the truck engine is started so as to transfer heat to the heater pipes 102 from the exhaust gases via heat exchanger 104. By means of the heat exchanger 114, heat is also supplied to the water 115 in the storage tank 116. Next, the vacuum pump 66 is started to create a vacuum in the tank 18. The supply line 64 is then coupled to a supply of fluid such as drilling mud that is to be loaded in the tank 18 and the tank 18 is filled. The liquid level in the tank can be seen by viewing an indicator 140. This allows the operator to fill the tank to the desired point. The truck is then driven to the desired location. The outlet 64 which is connected to a hose is then hooked up to a receiving point and the vacuum pump 66 is operated in reverse to function as a pump for producing pressure within the tank 18 for forcing the fluid out. To wash the inside of the tank, the pump 118 is started and the handles 94 are operated on each side to direct the spray nozzles 90 and 92 up and down as required to clean the inside of the tank. This is done after the hatch 62, and optionally hatch 60, have been removed allowing the washing operation to be observed by the operator while the sprayers 90 and 92 are directed by hand.

Figure 6:
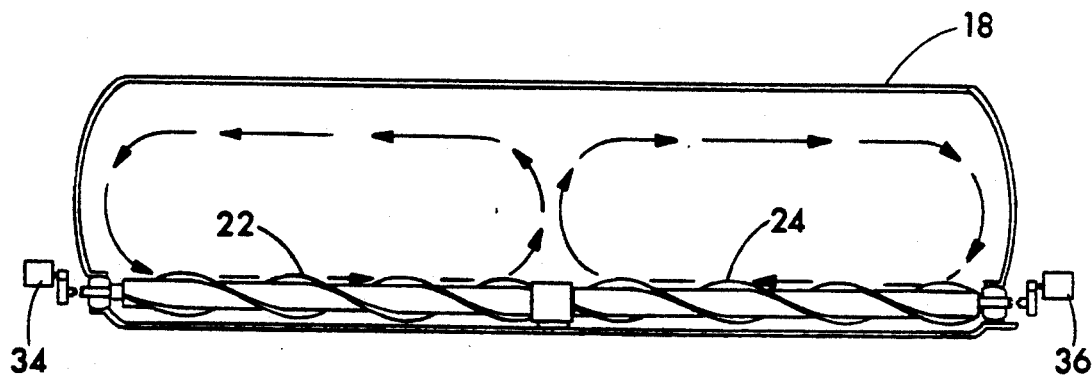
FIG. 6 is a diagrammatic view showing fluid circulation during one mode of operation.
Figure 7:
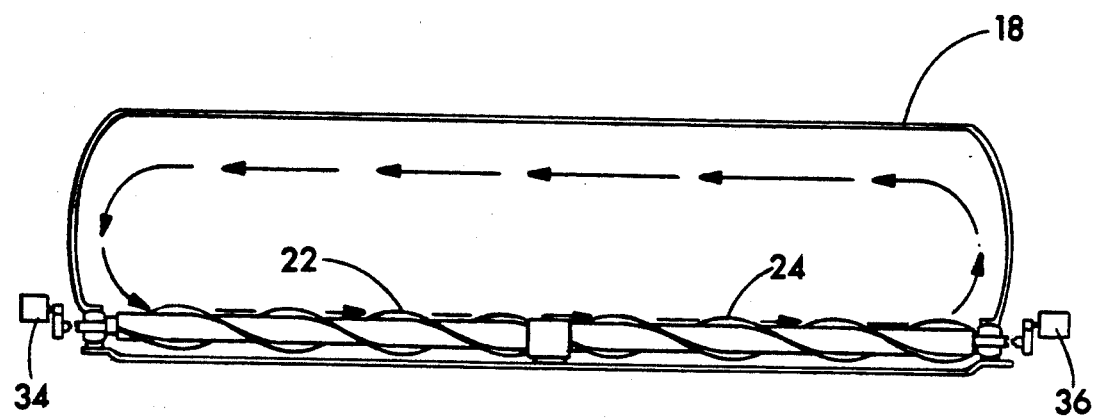
FIG. 7 is a view similar to FIG. 6 showing fluid circulation in a different mode.
Figure 8:
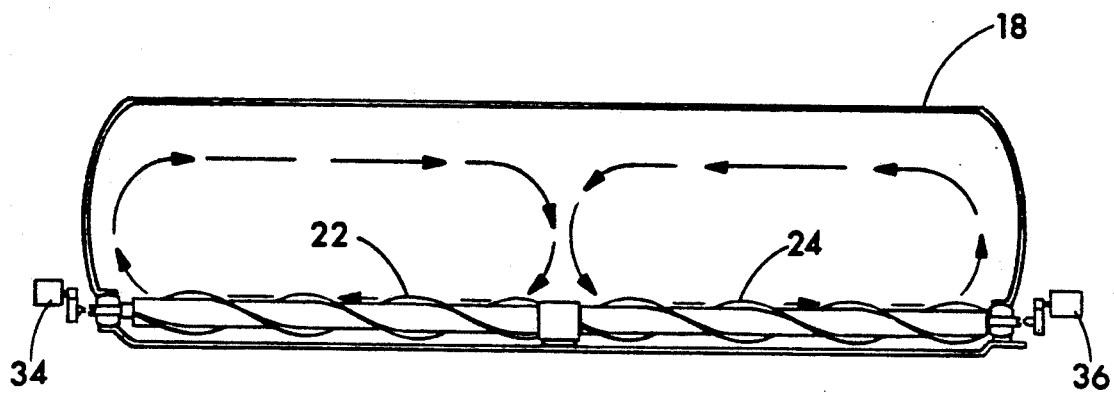
FIG. 8 is a view showing circulation in a different mode.

When the tank is full, an agitation of the tank contents is accomplished by means of the agitators 22 and 24 in any of several modes, three of which are depicted in FIGS. 6, 7 and 8. Both of the agitator motors can be set to operate at a low RPM, say 100 to 300 RPM, to keep a product such as drilling mud from thickening before reaching the desired destination and to distribute heat from heater 102 to the desired location. If the flow direction used in FIG. 7 is not satisfactory, the modes depicted in FIGS. 6 or 8 can be used, or if both motors are reversed flow will be as in FIG. 7 but in the reversed direction. It will thus be seen that by operating the motors in reverse directions the fluid can be made either to rise in a current at the center or descend at the center of the tank as required to achieve the desired mixing effect. An advantage of the helically flighted elongated agitators described is that they are relatively resistant to breakage as a result of being frozen to the wall of the tank. A 100-barrel capacity tank truck of the type described herein can be loaded with drilling mud or other liquid in about 15 minutes or less and unloaded in about 15 minutes or less.

As shown in FIG. 5, an additional reversible liquid pump 121 can be provided if desired to introduce and remove various other fluids such as salt solutions as well as other liquids whenever required Many variations within the scope of the appended claims will be apparent to those skilled in the art once the principles described herein are understood.

What is claimed is:

1. A tank truck comprising,
a fluid storage tank,
an agitator mounted within the tank,
said agitator including a shaft means having first and second end journaled for support on an axis of rotation in first and second bearings means, respectively, at spaced locations on the tank,
the first of said bearing means including a pivotable member adapted to allow the second end of the agitator mounted in the second bearing to be raised or lowered with respect to the second bearing,
said second bearing is a removable bearing supporting the second end of the agitator,
a drive means connected to the agitator for rotating the agitator, and
a releasable connection between the first end of the agitator and the drive means whereby the agitator can be released from the second bearing and withdrawn while the second end thereof is lifted away from the second bearing.

2. The tank truck of claim 1 wherein at least a pair of said agitators are provided, said agitator are elongated flighted independently rotatable unconnected conveyors mounted in cooperative relationship with respect to their positions relative to each other to cooperate with one another to distribute a fluid therein with each moving the fluid in the same or in a different direction.

3. The apparatus of claim 2 wherein the agitators are horizontally disposed and in longitudinal alignment, said agitators have adjacent ends supported by the second bearing, said second bearing comprises a removable bearing mounted between the agitators whereby adjacent ends of the agitators can be elevated so as to be withdrawn by removing the removable bearing.

4. The tank truck of claim 2 wherein independent reversible drive means is provided and the drive means is operatively associated with the agitators for turning the agitators in the same direction to move the fluid in the same direction or to turn the agitators in the opposite direction for moving the fluid in opposite directions within the tank.

5. The apparatus of claim 4 wherein said pair of agitators comprise elongated agitator members positioned in longitudinal alignment with a pair of ends positioned adjacent to one another in a lower portion of the tank whereby during operation of the agitators in the same direction fluid in the lower portion of the tank will flow in the same direction and fluid in the upper portion of the tank will flow in the opposite direction and when said agitators are operated in reverse directions fluid will be transferred vertically at a point in the tank at which the ends of the agitators are adjacent to one another.

6. The apparatus of claim 4 wherein each of the agitators is a helically flighted auger mounted in the lower portion of the tank and extending longitudinally with a pair of agitator ends positioned adjacent to one another and both of said adjacent ends are releasably mounted within said second bearing.

7. The tank truck of claim 6 wherein said drive means is supported outside of said tank, each of the augers includes an end portion projecting out through a wall of said tank and connected to a drive motor.

8. The tank truck of claim 1 wherein said first bearing comprises a self-aligning bearing having a bearing member including a curved outer surface allowing the first bearing member and agitator to be pivoted about a horizontal axis transverse to the agitator axis of rotation, said agitator has a shaft that projects through said first bearing, said shaft has a releasable coupling at the first end thereof, said releasable coupling is engageable with a drive means for imparting rotation to said agitator.

9. The tank truck of claim 1 wherein the agitator comprises an elongated auger agitator having at least one helical flight extending longitudinally thereof and projecting outwardly from the surface.

10. The apparatus of claim 1 wherein said removable bearing comprises a bearing support housing mounted within the tank, a pair of spaced apart bearing members therein and a removable cap allowing the bearing members to be removed after the cap is removed and at least one manually operable quick release toggle latch is releasably connected to the cap for locking the cap on the top of the bearing housing.

11. The tank truck of claim 1 wherein a heater is connected to the tank below a bottom wall of the tank beneath said agitator whereby the agitator propels fluid stored in the tank across the top of the heater and in heat exchange relationship therewith to transfer heat throughout the tank.

* * * * *